United States Patent
Seidel et al.

(10) Patent No.: US 8,146,320 B2
(45) Date of Patent: Apr. 3, 2012

(54) MODULAR KIT FOR A WIND TURBINE TOWER

(75) Inventors: Marc Seidel, Osnabrueck (DE); Martin Von Mutius, Ascheffel (DE); Ulrich Uphues, Hannover (DE)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 10/530,142

(22) PCT Filed: Sep. 30, 2003

(86) PCT No.: PCT/EP03/10839
§ 371 (c)(1),
(2), (4) Date: May 19, 2006

(87) PCT Pub. No.: WO2004/031578
PCT Pub. Date: Apr. 15, 2004

(65) Prior Publication Data
US 2006/0225379 A1     Oct. 12, 2006

(30) Foreign Application Priority Data

Oct. 1, 2002   (DE) .................................. 102 45 732

(51) Int. Cl.
*E04H 12/02*   (2006.01)
*E04C 3/30*    (2006.01)
(52) U.S. Cl. ..................... 52/651.01; 52/40; 52/170
(58) Field of Classification Search ............. 52/40, 170, 52/745.04, 223.4, 651.01
See application file for complete search history.

(56) References Cited

U.S. PATENT DOCUMENTS 3,514,918 A  *  6/1970  Archer et al. ............. 52/745.18
3,793,794 A  *  2/1974  Archer et al. .................. 52/632
(Continued)

FOREIGN PATENT DOCUMENTS
DE          199468899        7/2001
(Continued)

OTHER PUBLICATIONS

PCT International Search Report, PCT/EP2003/10839 filed on Sep. 30, 2003, mailed on Dec. 2, 2003, pp. 3 total.

(Continued)

*Primary Examiner* — Khoi Tran
*Assistant Examiner* — Jason Holloway
(74) *Attorney, Agent, or Firm* — Blakely, Sokoloff, Taylor & Zafman LLP

(57) ABSTRACT

The modular kit for a tower has a height ranging between a minimum height and a maximum height, in particular for a wind energy turbine, comprises a first conical tower segment (10) comprising a steel tube having a predetermined length (11), a second conical tower segment (12) comprising a steel tube having a predetermined length (12), and a first cylindrical tower segment (14) comprising a steel tube having a length between a predetermined minimum length and a predetermined maximum length. The length of the first cylindrical tower segment (14) can be adapted to the necessary height of the tower between its minimum height and its maximum height. The minimum height is the sum of the predetermined lengths (11,12) of the first and second conical tower segments (10,12) and the minimum length of the first cylindrical tower segment (14). The maximum height is the sum of the predetermined lengths (11,12) of the first and second conical tower segments (10,12) and the maximum length of the first cylindrical tower segment (14).

5 Claims, 2 Drawing Sheets

U.S. PATENT DOCUMENTS

| | | | |
|---|---|---|---|
| 4,272,929 A * | 6/1981 | Hanson | 52/40 |
| 4,590,718 A | 5/1986 | Angeloff | |
| 5,513,477 A * | 5/1996 | Farber | 52/848 |
| 5,826,387 A * | 10/1998 | Henderson et al. | 52/295 |
| 6,191,355 B1 * | 2/2001 | Edelstein | 174/45 R |
| 6,357,549 B1 | 3/2002 | Burkhart et al. | |
| 6,408,575 B1 * | 6/2002 | Yoshida et al. | 52/40 |
| 6,467,233 B1 * | 10/2002 | Maliszewski et al. | 52/831 |
| 6,672,023 B2 * | 1/2004 | Henderson | 52/296 |
| 6,802,169 B2 * | 10/2004 | Simmons | 52/648.1 |
| 6,851,231 B2 * | 2/2005 | Tadros et al. | 52/223.4 |
| 7,155,875 B2 * | 1/2007 | Henderson | 52/741.15 |
| 2003/0000165 A1 * | 1/2003 | Tadros et al. | 52/223.4 |
| 2003/0147753 A1 * | 8/2003 | Ollgaard | 416/244 A |
| 2004/0098935 A1 * | 5/2004 | Henderson | 52/296 |
| 2005/0166521 A1 * | 8/2005 | Silber | 52/633 |
| 2007/0148004 A1 * | 6/2007 | Wernicke et al. | 416/244 R |

FOREIGN PATENT DOCUMENTS

| | | |
|---|---|---|
| GB | 2203767 A * | 10/1988 |
| WO | WO 01/71184 A1 | 9/2001 |
| WO | WO 02/38891 A1 | 5/2002 |

OTHER PUBLICATIONS

PCT Notification of Transmittal of the International Preliminary Examination Report, for PCT/EP2003/010839, mailed Dec. 28, 2004 (6 pages).

PCT Written Opinion for PCT/EP2003/010839, mailed Sep. 13, 2004 (4 pages).

* cited by examiner

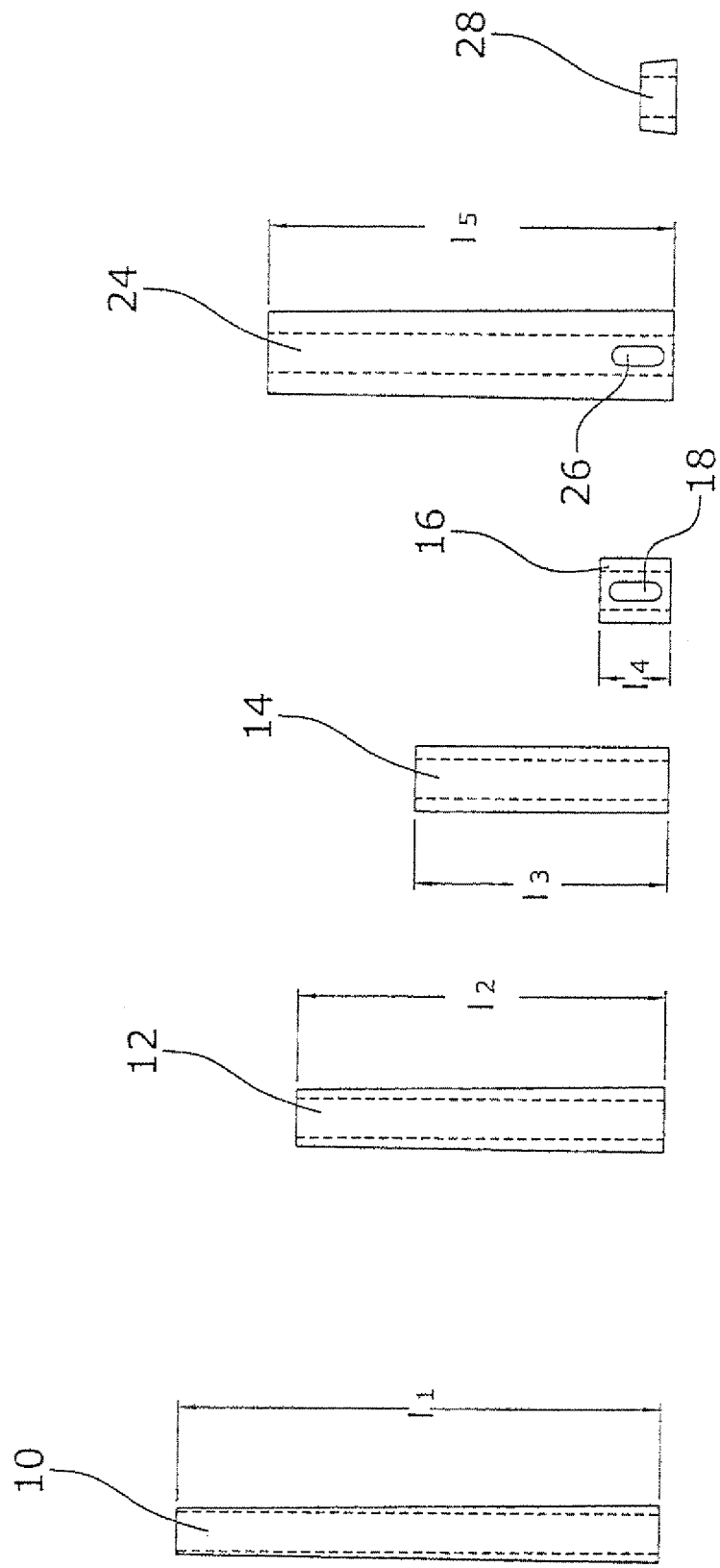

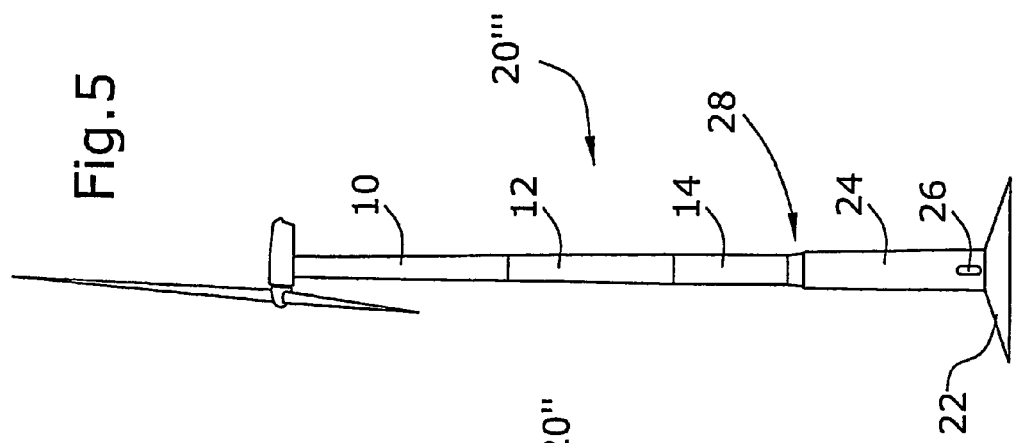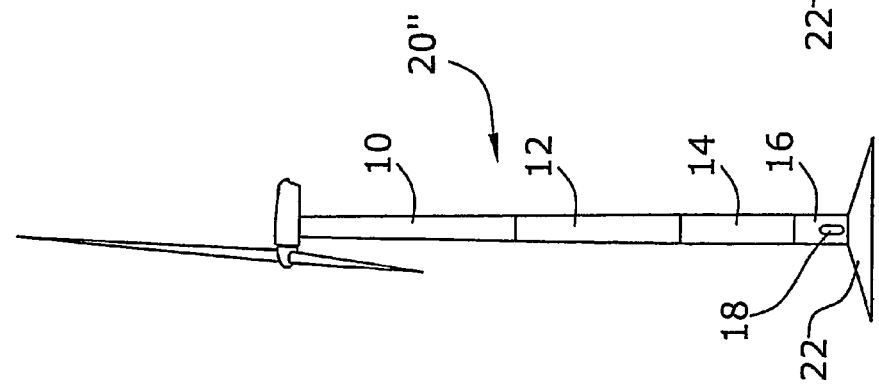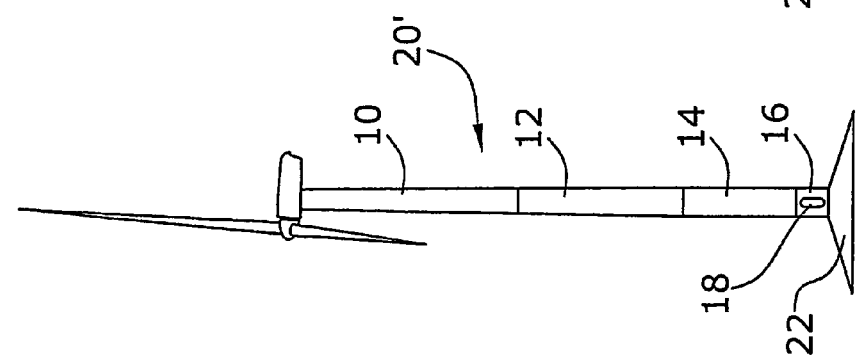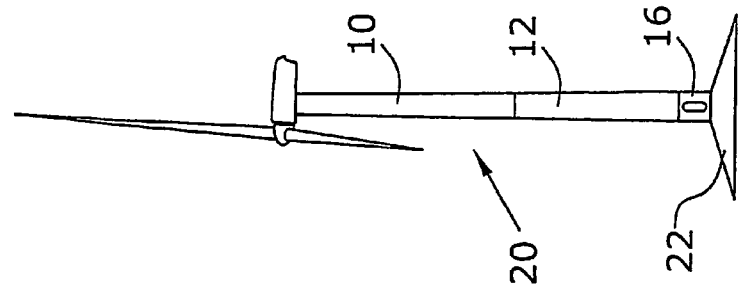

MODULAR KIT FOR A WIND TURBINE TOWER

CROSS-REFERENCE TO OTHER APPLICATIONS

This application is a National Phase Application of International Application No. PCT/EP2003/010839, filed Sep. 30, 2003, which claims the priority of German Patent Application No. 102 45 732.8, filed Oct. 1, 2002. The present application claims priority from both applications.

BACKGROUND OF THE INVENTION

1. Field of the Invention

The present invention relates to a modular kit for a tower having a height ranging between a predetermined minimum height and a predetermined maximum height. In particular, the present invention relates to a modular kit for a tower of a wind energy turbine.

2. Related Prior Art

The tower of a wind energy turbine is one of the most expensive parts of a wind energy plant. Typically, those towers are made of steel tubes connected to each other via flanges or prestressed concrete tubes. It is also known to use lattice towers for wind energy turbines. However, towers made of tubular segments are preferred over lattice towers due to the easier manufacturing and assembly. Moreover, with increasing height, lattice, towers require relatively large foot prints.

Generally, towers for wind energy turbines comprise several tower segments. Towers of this type have to be designed for different heights of the tower. This is rather expensive concerning the engineering required.

Accordingly, there is a need for a kit for a tower having several segments by which towers of a height ranging between a minimum height and a maximum height can be assembled comparatively easy with no redesign of the static construction required.

SUMMARY OF THE INVENTION

The invention provides for a modular kit for a tower having a height ranging between a minimum height and a maximum height, in particular for a wind energy turbine, comprising:
a first conical tower segment comprising a steel tube having a predetermined length,
a second conical tower segment comprising a steel tube having a predetermined length, and
and a first cylindrical tower segment comprising a steel tube having a length between a predetermined minimum length and a predetermined maximum length,
wherein the length of the first cylindrical tower segment can be adapted to the necessary height of the tower between its minimum height and its maximum height, the minimum height being the sum of the predetermined lengths of the first and second conical tower segments and the minimum length of the first cylindrical tower segment, and the maximum height being the sum of the predetermined lengths of the first and second conical tower segments and the maximum length of the first cylindrical tower segment.

According to the invention, the modular kit comprises two conical tower segments each having a predetermined fixed length. Moreover, at least one cylindrical tower segment (referred to hereinbelow as first cylindrical tower segment) is included in the modular kit according to the invention. The length of this first cylindrical tower segment can be adapted to the height of the tower as required. The length of the first cylindrical tower segment ranges between a predetermined minimum length and a predetermined maximum length. By varying the length of the first cylindrical tower segment, the height of the tower can be adapted to the required value.

According to the invention, depending on the height of the tower, the first cylindrical tower segment can include a door opening.

If by means of the modular kit according to the invention a tower shall be erected having a height larger than the maximum height as defined before, a second cylindrical tower segment can be used which as is the case for the first and second conical tower segments as well as the first cylindrical tower segment, comprises a steel tube. The steel tube of the second cylindrical tower segment includes a door opening and has a length. By including the second cylindrical tower segment into the modular kit according to the invention, the maximum height of the tower can be increased by the length of the second cylindrical tower segment.

It is preferred that the length of the second cylindrical tower segment can be selected between a minimum length and a maximum length.

According to the invention it is also possible that in addition to the first and second conical tower segments and the first cylindrical tower segment also a tower segment made of prestressed or otherwise reinforced concrete can be added. This additional tower segment can have a fixed length or can be variable in its length direction. A connecting element is provided for connecting the first cylindrical tower segment with the additional tower segment.

Typically, according to a preferred embodiment of the invention, the first and second conical tower segments each have a wall thickness decreasing towards their smaller ends, i.e. to their upper ends in the installed condition of the tower. The first cylindrical tower segment typically has a wall thickness essentially constant over the length of the tower segment. This is also true for the second cylindrical tower segment, if present.

A tower segment for use as a part of a modular kit according to the invention is a tower element which can be connected to an adjacent tower element by means of a flange or the like mechanical connection. Moreover the tower segments of the invention are substantially tubular.

The fixed length of the first and second conical tower segments as well as the maximum length of the cylindrical tower segment are selected such that it is still possible to transfer the tower segments from the manufacturing site to the location where the tower has to be erected, by normal transportation means like trucks or the like.

As far as conical tower segments are described herein, tower segments are meant to have at least one conical section. A conical tower segment in this sense, accordingly, can have one or more cylindrical sections, several conical sections with different conical angles (also inverse conical angles), spherically shaped sections, sections with annular, elliptical or polygonal cross sections as well as combinations of these sections. Also the cylindrical tower segment or tower segments can have cross sections deviating from a circular cross section. For example, the cylindrical tower segment or tower segments can have square shaped or rectangular cross sections. Thus, the term cylindrical should be understood in a mathematical sense according to which a cylindrical wall is defined as a closed wall defined by shifting a straight line along a closed loop. The cross sections of the cylindrical tower segment or segments can also vary over the length of the cylindrical tower segment. Accordingly, conical and cylindrical have to be understood in the sense of substantially conical and substantially cylindrical, respectively.

BRIEF DESCRIPTION OF THE DRAWINGS

Some of the above indicated and other more detailed aspects of the invention will be described in the following description and partially illustrated in the drawings. As used herein, like numerals throughout the various figures represent the same or equivalent features of the present invention. Therein:

FIGS. 1a-1f are views of the individual tower segments belonging to the kit according to the invention for assembly of a tower for a wind energy turbine, and FIGS. 2 to 5 are views of wind energy turbines comprising towers of different heights made from the kit of the invention.

DESCRIPTION OF A PREFERRED EMBODIMENT OF THE INVENTION

FIGS. 1a-1f are lateral views of the different tower segments of the kit according to the invention. As depicted, the kit includes a conical first tower segment 10 made from steel tubing and having a predetermined length 11, and a second conical tower segment 12 made from steel tubing and having a predetermined length 12 which is smaller than the length 11 of the first tower segment. The wall thickness of both tower segments is tapering towards those ends which are the upper ends in the assembled condition of the tower segments, with the diameter of the first tower segment at the lower end thereof being equal to the diameter of the second tower segment at the upper end of the latter.

A third tower segment 14 of the inventive kit comprises a cylindrical steel tube whose length 13 is variable. Finally, the inventive kit includes a fourth tower segment 16 which is again provided as a cylindrical steel tube and has a door opening 18 formed therein. Also the length 14 of this fourth tower segment is variable.

Using the above described four tower segments, towers of different heights can be erected, as illustrated in FIGS. 2 to 4. The hub or tower heights of these three wind energy turbines vary by up to 50% from the minimum height. Thus, for instance, the wind power turbine according to FIG. 2 comprises a tower 20 which includes the two cylindrical tower segments 10 and 12 and the tower segment 16 with the door opening 18 therein. Tower segment 10 is arranged above tower segment 12 which in turn has the tower segment 16 arranged thereunder. The overall tower rests on a base 22.

In contrast to the above arrangement, the tower 20' of the wind energy turbine according to FIG. 3 additionally includes the third tower segment 14 which is arranged between the conical second tower segment 12 and the fourth tower segment 16 with the door opening. Tower segment 16 can also be provided as an integral part with tower segment 14, with the door opening 18 formed in the third tower segment 14.

In the tower 20" of the wind energy turbine according to FIG. 4, the tower is again made from the above described four tower segments 10,12,14,16 wherein the two latter tower segments 14 and 16 have different lengths as compared to the tower 20' of the wind energy turbine of FIG. 3.

Using a fifth tower segment 24 (see FIG. 1) from steel concrete, it is made possible, in combination with the two conical tower segments 10 and 12 and the cylindrical third tower segment 14, to further increase the height of the tower of a wind energy turbine. Also the length (l5) of the fifth tower segment 24 is variable. This fifth tower segment 24, being provided as a base made from prestressed concrete, has an extreme bending resistance so that the tower assembled from this tower segment and the second and third tower segments will remain within the allowable inherent frequency. The prestressed-concrete tower segment 24 is provided with a door opening 26.

FIG. 5 shows a wind energy turbine comprising a tower 20''' assembled from the first, second, third and fifth tower segments. Tower 20''' additionally comprises a connection segment 28 (cf. also FIG. 1) functioning as an adapter between the third steel-tubing tower segment 14 and the prestressed-concrete tower segment 24.

On the basis of the above described kit with its five tower segments which will largely determine the overall height of the respective tower, towers with heights in the range from 60 m to 100 m can be constructed. The conical first and second tower segment 10 and 12 have a length of e.g. 30 m and 25 m, respectively, while the cylindrical third tower segment has a maximum length of 18.5 m. The fourth tower segment with the door opening has a length between 3.8 m and 8.8 m while the fifth (prestressed-concrete) tower segment has a length of 22 m. Just as the third tower segment, also the fifth tower segment can be variable in length by the manufacturer. In this regard, it is to be observed that a transport of these tower segments by flat-bed trucks or the like vehicles should still be possible. Generally, thus, depending on the respective desired height of the tower, the third, fourth and—if required—fifth tower segments should be adjustable in length by the manufacturer.

The kit according to the invention is provided as a fully modular system, while the following limiting conditions have to be fulfilled:

To allow for modularity, the third and fourth tower segments 14,16 are cylindrical; the diameter of the tower at the lower end of the smallest tower to be assembled is selected to be 4.3 m for convenience of transport.

The door opening 18 is placed in the fourth tower segment 16. Thus, the thicknesses of the sheet metal in the segments above the fourth tower segment 16 can be optimized under statical and dynamic criteria irrespective of locally required larger thicknesses resulting from the door.

The advantages of the above described fully modular system can be summarized as follows:

Since no restrictions exist with regard to the transition to adjacent smaller wall thicknesses, the wall thickness in the region of the door can be virtually as large as desired. Thus, a larger door can be planned right away, thus preserving the option to arrange the transformer within the tower and not in a transformer shed.

The same foundation section can be used for all towers.

The need for expensive concrete base solutions is obviated.

Up to a tower height of about 85 m (in the instant embodiment), the towers can be provided completely as steel-tubing towers. From this height onwards, higher towers are provided as hybrid towers, with their upper segments (first, second and third tower segments) formed as steel-tubing segments and their lower segment formed as a prestressed-concrete segment (fifth tower segment). This configuration allows tower heights up to 100 m.

For different tower heights, there will always be used uniform tower segments whose length will be partially adaptable. This is advantageous with respect to assembly, disposition and maintenance.

The steel-tubing segments can be combined with the prestressed concrete base so that the thus erected towers will remain within the range of their allowable inherent frequencies.

Due to the cylindrical steel-tubing segments, variable tower heights can be realized with little expenditure and without changing the connection flanges.

The tower segment with the door opening can be realized more easily, while harsh transition regions in the wall thickness are avoided.

By suitable construction of the individual segments, it will suffice if only those segments which are exposed to the highest stresses as caused by e.g. wind, are adapted correspondingly. In this regard, towers of lower heights will generally offer larger reserves in their construction.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A tower of a wind energy turbine, comprising:
 a first conical tower segment comprising a steel tube having a predetermined length;
 a second conical tower segment comprising a steel tube having a predetermined length, wherein the first conical tower segment is directly coupled to the second conical tower segment in an assembled condition, the diameter of the first conical tower segment at a lower end being equal to the diameter of the second conical tower segment at an upper end;
 a first cylindrical tower segment comprising a single steel tube having a length between a predetermined minimum length and a predetermined maximum length, wherein the second conical tower segment is directly coupled to the first cylindrical tower segment in the assembled condition, the diameter of the second conical tower segment at a lower end being equal to the diameter of the first cylindrical tower segment; and
 a further tower segment comprising prestressed-concrete having a door opening, wherein the first cylindrical tower segment is coupled to the further tower segment in the assembled condition, the diameter of the first cylindrical tower segment being equal to the diameter of the further tower segment at an upper end,
 wherein the first and second conical tower segments each have a wall thickness decreasing towards their upper ends in an installed condition of the tower.

2. The tower of claim 1, wherein the further tower segment comprises a steel tube, and wherein the maximum height is approximately eighty-five meters.

3. The tower of claim 1, wherein the further tower segment is formed of a prestressed-concrete tube having a door opening, and wherein the maximum height is approximately one hundred meters.

4. The tower of claim 3, wherein the further tower segment comprises a connecting element for connecting the first cylindrical tower segment with the further tower segment.

5. The tower according to claim 1, wherein the minimum height of the tower is the sum of the predetermined lengths of the first and second conical tower segments, the minimum length of the first cylindrical tower segment and the length of the further tower segment, and wherein the maximum height of the tower is the sum of the predetermined lengths of the first and second conical tower segments, the maximum length of the first cylindrical tower segment and the length of the further tower segment, the maximum height exceeding approximately eighty meters.

* * * * *